(12) United States Patent
Naritomi et al.

(10) Patent No.: US 9,545,740 B2
(45) Date of Patent: Jan. 17, 2017

(54) COMPOSITE OF METAL AND RESIN AND METHOD FOR MANUFACTURING THE SAME

(71) Applicant: TAISEI PLAS CO., LTD., Tokyo (JP)

(72) Inventors: Masanori Naritomi, Tokyo (JP); Naoki Andoh, Tokyo (JP)

(73) Assignee: TAISEI PLAS CO., LTD., Tokyo (JP)

( * ) Notice: Subject to any disclaimer, the term of this patent is extended or adjusted under 35 U.S.C. 154(b) by 0 days.

(21) Appl. No.: 14/250,127

(22) Filed: Apr. 10, 2014

(65) Prior Publication Data

US 2014/0217064 A1    Aug. 7, 2014

Related U.S. Application Data

(62) Division of application No. 12/521,149, filed as application No. PCT/JP2007/075287 on Dec. 28, 2007, now abandoned.

(30) Foreign Application Priority Data

Dec. 28, 2006  (JP) ................................. 2006-354636

(51) Int. Cl.
*C03C 15/00* (2006.01)
*D06N 7/00* (2006.01)
(Continued)

(52) U.S. Cl.
CPC ......... *B29C 45/14* (2013.01); *B29C 45/14311* (2013.01); *B32B 5/147* (2013.01);
(Continued)

(58) Field of Classification Search
CPC ..................... B29C 2045/14868; B29C 45/14; B29C 45/14311; B29C 45/14336; B29K 2067/006; B29K 2077/10; B29K 2081/04; B29K 2705/00; B29K 2705/02; B32B 15/18; B32B 2262/0261; B32B 2262/0269; B32B 2262/101; B32B 2262/106; B32B 2270/00; B32B 2307/542; B32B 27/32; B32B 27/34; B32B 27/36; B32B 27/38; B32B 5/147
(Continued)

(56) References Cited

U.S. PATENT DOCUMENTS 5,275,696 A * 1/1994 Gaskin et al. ................ 216/108
5,654,358 A   8/1997 Kadoi et al.
(Continued)

FOREIGN PATENT DOCUMENTS

EP   1 690 664 A1   8/2006
JP   05-163587 A    6/1993
(Continued)

OTHER PUBLICATIONS

International Search Report of PCT/JP2007/075287, Mailing Date of Feb. 26, 2008.
(Continued)

*Primary Examiner* — Nadine Norton
*Assistant Examiner* — Christopher Remavege
(74) *Attorney, Agent, or Firm* — Westerman, Hattori, Daniels & Adrian, LLP (57) ABSTRACT

It is an object to manufacture a composite of a metal part and a resin composition part, which is improved so as to securely join and integrate stainless steel and a resin. A stainless steel part whose surface has been suitably roughened by chemical etching or the like can be used. An integrated product is obtained by inserting a stainless steel piece 1 with its surface treated into a cavity formed by a movable-side mold plate 2 and a fixed-side mold plate 3 of a metallic mold for injection molding 10 and injecting a specific resin. PBT, PPS or an aromatic polyamide resin can be used as the main resin
(Continued)

component of a resin composition 4 that is used. High injection joining strength is obtained if the resin composition contains, as an auxiliary component, PET and/or a polyolefin resin in the case of PBT, a polyolefin resin in the case of PPS and an aliphatic polyamide resin in the case of an aromatic polyamide resin.

2 Claims, 3 Drawing Sheets (51) Int. Cl.

| | |
|---|---|
| B29C 45/14 | (2006.01) |
| B32B 15/08 | (2006.01) |
| C23C 22/05 | (2006.01) |
| C23C 22/18 | (2006.01) |
| C23C 22/57 | (2006.01) |
| C23C 22/83 | (2006.01) |
| C23F 1/22 | (2006.01) |
| B32B 5/14 | (2006.01) |
| B32B 15/18 | (2006.01) |
| B32B 27/18 | (2006.01) |
| B32B 27/28 | (2006.01) |
| B32B 27/30 | (2006.01) |
| B32B 27/32 | (2006.01) |
| B32B 27/34 | (2006.01) |
| B32B 27/36 | (2006.01) |
| B32B 27/38 | (2006.01) |
| B29K 67/00 | (2006.01) |
| B29K 77/00 | (2006.01) |
| B29K 81/00 | (2006.01) |
| B29K 705/00 | (2006.01) |
| B29K 705/02 | (2006.01) |

(52) U.S. Cl.
CPC .............. *B32B 15/08* (2013.01); *B32B 15/18* (2013.01); *B32B 27/18* (2013.01); *B32B 27/286* (2013.01); *B32B 27/308* (2013.01); *B32B 27/32* (2013.01); *B32B 27/34* (2013.01); *B32B 27/36* (2013.01); *B32B 27/38* (2013.01); *C23C 22/05* (2013.01); *C23C 22/18* (2013.01); *C23C 22/57* (2013.01); *C23C 22/83* (2013.01); *C23F 1/22* (2013.01); *B29C 45/14336* (2013.01); *B29C 2045/14868* (2013.01); *B29K 2067/006* (2013.01); *B29K 2077/10* (2013.01); *B29K 2081/04* (2013.01); *B29K 2705/00* (2013.01); *B29K 2705/02* (2013.01); *B32B 2262/0261* (2013.01); *B32B 2262/0269* (2013.01); *B32B 2262/101* (2013.01); *B32B 2262/106* (2013.01); *B32B 2270/00* (2013.01); *B32B 2307/54* (2013.01); *B32B 2307/542* (2013.01); *B32B 2307/704* (2013.01); *B32B 2307/714* (2013.01); *B32B 2457/00* (2013.01); *B32B 2509/00* (2013.01); *B32B 2535/00* (2013.01); *B32B 2605/00* (2013.01); *Y10T 428/24405* (2015.01)

(58) Field of Classification Search
USPC .......... 216/35, 52, 100, 101, 103, 106, 108; 428/141, 142, 143, 144, 147, 148, 343, 428/344, 621, 638, 696
See application file for complete search history.

(56) References Cited

U.S. PATENT DOCUMENTS

| | | |
|---|---|---|
| 2006/0127684 A1 | 6/2006 | Naritomi et al. |
| 2007/0031676 A1 | 2/2007 | Itou et al. |

FOREIGN PATENT DOCUMENTS

| | | | |
|---|---|---|---|
| JP | 2001-011662 A | | 1/2001 |
| JP | 2002-120002 A | | 4/2002 |
| JP | 2004-216609 A | | 8/2004 |
| JP | 2005342895 A | * | 12/2005 |
| WO | 2005/046957 A1 | | 5/2005 |

OTHER PUBLICATIONS

"Stainless Steel—Surface Finishing," http://www.azom.com/article.aspx?ArticleID=1142#, Jan. 2, 2002.
U.S. Non-Final Office Action dated Feb. 15, 2012, issued in U.S. Appl. No. 12/521,149.
U.S. Final Office Action dated Sep. 7, 2012, issued in U.S. Appl. No. 12/521,149.
U.S. Non-Final Office Action dated Sep. 5, 2013, issued in U.S. Appl. No. 12/521,149.
U.S. Final Office Action dated Jan. 10, 2014, issued in U.S. Appl. No. 12/521,149.

* cited by examiner

COMPOSITE OF METAL AND RESIN AND METHOD FOR MANUFACTURING THE SAME

CROSS-REFERENCE TO RELATED APPLICATIONS

This application is a divisional of U.S. application Ser. No. 12/521,149, filed on Jun. 25, 2009, which is a 371 of International Application No. PCT/JP2007/075287, filed on Dec. 28, 2007, which is based upon and claims the benefit of priority from the prior Japanese Patent Application No. 2006-354636, filed on Dec. 28, 2006, the entire contents of which are incorporated herein by reference.

FIELD OF THE INVENTION

The present invention relates to a composite of a metal part, particularly one made of stainless steel or a part made of an alloy thereof, and a molded resin article, which is used for the housings of electronic equipments, the housings of consumer electrical equipments, mechanical parts and so forth and also related to a method for manufacturing the composite. More particularly, the present invention relates to a composite, in which a thermoplastic resin composition is integrated with a stainless steel part made by mechanical working, and to a method for manufacturing the composite and also relates to a composite of metal and resin, which can be used in various electronic equipments, consumer electrical products, medical instruments, automotive structural parts, automotive mounted equipments or other electrical parts or in corrosion resistant exterior trim parts or the like and to a method for manufacturing the composite.

BACKGROUND OF THE INVENTION

Technology for integrating metals and resins is needed in many different fields of industry, such as manufacturing of parts for automobiles, consumer electrical products, industrial machinery and so forth and many adhesive agents have been developed for this purpose. Some very excellent adhesives have been proposed. For example, adhesives that exhibit their function at normal temperature or with heating are used to integrally join metals and synthetic resins and this method is currently a common joining technique.

On the other hand, more rational joining methods that do not involve the use of an adhesive have been studied heretofore. An example is a method in which a high-strength engineering plastic is integrated with a light metal such as magnesium, aluminum or an alloy of these or an iron alloy such as stainless steel without using any adhesive. For instance, the inventors proposed a method, in which a molten resin is injected onto a metal part preliminarily inserted into a metallic mold for injection molding thereby forming a resin portion and at the same time the molded article and the metal part are joined (hereinafter this will be referred to as "injection joining").

According to the technology, a manufacturing technique was proposed, in which a polybutylene terephthalate resin (hereinafter referred to as "PBT") or a polyphenylene sulfide resin (hereinafter referred to as "PPS") is joined by injection joining to an aluminum alloy (see Japanese Patent Application Laid-open No. 2004-216425: Patent Document 1, for example). A joining technique was also disclosed, in which somewhat large holes (but invisible to the naked eye) is made in an anodized film on a piece of aluminum and a synthetic resin is made to penetrate into these holes and adjoined there (see WO/2004-055248 A1: Patent Document 2, for example).

The principle behind the injection joining in Patent Document 1 is as follows. An aluminum alloy is immersed in a dilute aqueous solution of a water-soluble amine compound and the aluminum alloy is finely etched with a weakly basic aqueous solution. It was found that the amine compound molecules are adsorbed to the surface of the aluminum alloy at the same time in this immersion treatment. After undergoing this immersion treatment, the aluminum alloy is inserted into a metallic mold for injection molding and a molten thermoplastic resin is injected under high pressure.

Here, the amine compound molecules adsorbed to the surface of the aluminum alloy encounter the thermoplastic resin to produce a chemical reaction such as an exothermic reaction or a macromolecular cleaving reaction. As a result of this chemical reaction, the thermoplastic resin, which was apt to be quenched, crystallized and solidified by contact with the aluminum alloy held at a low temperature of the mold, is not solidified as quickly and gets into ultrafine recesses on the aluminum alloy surface. Consequently, with a composite composed of an aluminum alloy and a thermoplastic resin, the thermoplastic resin is securely joined (hereinafter also referred to as fixed) without being separated from the aluminum alloy surface. That is, when an exothermic reaction or a macromolecular cleaving reaction occurs, a strong injection joint is produced. It has actually been confirmed that PBT or PPS, which can undergo the above-mentioned chemical reaction with an amine compound, can be joined by injection joining to an aluminum alloy. Another well known technique involves performing chemical etching preliminarily, then inserting a metal part into the metallic mold of an injection molding machine and performing injection molding with a thermoplastic resin material (see Japanese Patent Application Laid-Open No. 2001-225352: Patent Document 3, for example).

However, although the joining principle in Patent Document 1 by the inventors does exhibit an extremely good effect with aluminum alloys or the like, it has not effect in injection joining to other metals besides aluminum alloys. Accordingly, there has been a need for the development of a novel technique for joining metals and resins. The inventors discovered such a novel technique in the course of making improvements to injection joining of a hard resin to an aluminum alloy. Specifically, the conditions were discovered under which injection joining might be possible without any chemical adsorption of the amine compound to the metal part surface, in other words, without the help of a special exothermic reaction or any particular chemical reaction.

At least two conditions are necessary. The first condition is that a hard resin of high crystallinity be used, namely, that PPS, PBT or an aromatic polyamide be used and, furthermore, that these be suited to injection joining to obtain a further improved composition. Another condition is that the surface layer of the metal part have a suitably rough shape and that the surface be hard. In ordinary words, this means that the surface is strong and strength is expressed in terms of material mechanics by tensile strength, compression strength, shear strength and so forth. However, the actual thickness of the surface layer to which attention is paid in the present invention is from ten to a few dozen nanometers and the strength of such a fine portion can be rephrased as hardness. Therefore, the surface layer is preferably a ceramic layer whose hardness is higher than that of metal crystals and, more specifically, the inventors attained the conclusion that it is essential for the surface layer to be a metal oxide or metal phosphorus oxide.

For example, when a shaped material in which a copper alloy serves as the substrate is used and it is immersed in an acidic hydrogen peroxide aqueous solution, the copper is oxidized to become copper ions. As a result, if the immersion conditions are suitably set, the surface of the substrate is chemically etched to a surface roughness in which the bumps have a period of one to several microns. If the chemically etched copper alloy that has been shaped is then immersed in a strongly basic sodium chlorite aqueous solution, the copper is oxidized but the copper ions do not dissolve and the surface is covered with a thin layer of cupric oxide. Examination of this surface with an electron microscope revealed it to be covered by a ultrafine textured face in which recesses (openings) with a diameter of several dozen to several hundred nanometers are present at a period of several hundred nanometers.

These shaped copper alloys with their surfaces treated are considered theoretically as follows, assuming that they are inserted into a metallic mold for injection molding. The metallic mold for injection molding and the inserted shaped copper alloy are generally held at a temperature that is at least by 100° C. below the melting point of the resin being injected, although it varies with the injection molding conditions, so there is a high possibility that the temperature of injected resin may have dropped below its melting point at the time when it is quenched upon entering the channel inside the metallic mold for injection molding and comes into contact with copper alloy part.

Regardless of the crystalline resin, when it is rapidly cooled to below its melting point, it does not become crystallized and solidified immediately (that is, in zero time) but there is a time, albeit an extremely short time, for the resin to remain in a molten state below the melting temperature or, in other words, in a super-cooled state. If the roughness (surface roughness) of a shaped alloy is on the micron order, that is, if the recesses are large with an inside diameter of several microns, then microcrystalline resin will penetrate into these recesses within the limited time from super-cooled state to creation of the initial crystals, that is, microcrystals. To put this in another way, if the numerical density of the macromolecular microcrystal group that is produced is still low, then the resin will sufficiently penetrate into the recesses as long as the recesses are large with an inside diameter of several microns.

These microcrystals of the injected resin are surmised from molecular models to have a size from a few to more than a dozen nanometers. If there are fine openings (holes in the recesses) about 50 nm in diameter in the inner walls of the above-mentioned micron-order recesses, then there is a slight possibility of penetration, although it can hardly be said that microcrystals can readily penetrate these fine openings. Specifically, countless microcrystals are simultaneously produced, so there is an abrupt increase in the viscosity of the resin flow at places abutting on the metal face of the mold or at the distal end of the injected resin. Therefore, this resin flow is surmised to have a shape resembling the roots of a plant that stick slightly into the fine openings in the inner wall faces.

In other words, the flowing molten resin cannot penetrate into the deep portions of the fine openings but does penetrate somewhat, then crystallizes and solidifies to become a crystalline resin that has solidified in the micron-order recesses. In addition, if the metal surface layer that forms the fine openings is copper oxide, that is, a hard ceramic surface layer, then the resin will be hooked more securely within the recesses, making it less likely that the resin having solidified and crystallized will come out of the recesses. In short, the joint strength will be higher.

Improving the resin composition that is injected is an important element in the present invention. Specifically, if the resin composition is one that crystallizes slowly in injection molding (when quenched from a molten state to a temperature below the melting point), the joint strength will be higher. This is a requirement for a resin composition to be suitable for injection joining. Based on this, the inventors discovered that, if the surface of a shaped copper alloy is chemically etched as discussed above, the surface layer is made into a ceramic by a surface treatment such as oxidation and a hard crystalline resin is joined by injection joining to this, good joining ability is obtained (PCT/JP2007/070205). The inventors have also made a proposal based on their finding that, in addition to the above-mentioned PBT-based and PPS-based resins, a resin composition whose main component is an aromatic polyamide resin is also a suited to injection joining as a resin composition which is hard and highly crystalline and crystallizes extremely slowly during quenching similarly as in the technology discussed just above (PCT/JP2006/324493).

In the above description about the theory of injection joining, there is nothing that limits the kinds of metal. This indicates that injection joining can be performed using PBT, PPS or other such crystalline resin that has been improved for use in injection joining with respect to all metals and metal alloys, as long as it has the same surface shape and surface layer properties. Patent Document 3 discloses a method for manufacturing a lead wire-equipped battery cover having a shape such that several copper wires pass through the middle portion of a PPS disk, in which a chemically etched copper wire is inserted into a metallic mold for injection molding, and PPS is injected. This technology is said to be characterized by the fact that even if the internal pressure of gas generated in a battery rises a labyrinth effect will prevent the gas from leaking out through the lead wire part owing to the shape of bumps (roughness) on the surface of a copper wire by chemical etching.

At first glance the technology discussed in Patent Document 3 represents one that is similar to that according to the present invention. However, it is not the above-mentioned injection joining technology that the inventors assert in detail but is instead a technology that is an extension of existing injection molding technology and is no more than one that utilizes the difference in the linear coefficient of expansion of metals and the molding shrinkage of resins. In manufacturing a shaped article in which a rod-like metal piece passes through the inner portion of a resin part, if the resin is injected around this rod-like piece for injection molding, then the molded article is parted from the mold for injection molding and allowed to be cooled, the rod-like piece is in such a situation as to be pressed by the surrounding molded resin portion. The reason is that the linear coefficient of expansion of a metal is at most 1.7 to 2.5× $10^{-5}$° $C.^{-1}$ for an aluminum alloy, magnesium alloy, copper or copper alloy and, even if the calculation is made on the assumption that the metal has been removed from the metallic mold for injection molding and cooled to room temperature, the shrinkage will be in a range of the linear coefficient of expansion multiplied by a hundred and several tens of degrees and it will be no more than 0.2 to 0.30 of the total length.

Concerned with a resin, however, the molding shrinkage is about 1% for PPS and 0.5% for PPS containing glass fiber and even for a resin, in which the filler content has been increased, the resin portion will always undergo more heat shrinkage than the metal part after injection molding. Therefore, if a shaped article in which the metal part is disposed in the center and this metal part goes through the resin portion is produced by injection molding with an insert, an integrated product can be manufactured in which the metal part is not likely to come loose due to the pressing effect produced by heat shrinkage after the molding of the resin portion.

This method for manufacturing an integrated metal and resin product that makes use of heat shrinkage is known conventionally and is used to fabricate knobs on fuel oil stoves, for example. This method involves inserting a thick iron needle with a diameter of about 2 mm into a metallic mold for injection molding and injecting a heat resistant resin or the like into the mold. In this method, jagged bumps (by knurling) are formed around the outer peripheral face of the needle and the resin is injected and molded so that there is no relative movement. Patent Document 3 discloses that the surface configuration is smoothed by changing the texturing process from a physical process to a chemical process with knurling or the like, bumps are made finer and grip effect is improved by using a resin that is hard and crystalline.

The composite according to the present invention does not at all require that the resin press the metal by heat shrinkage or the like, and even with a shaped article in which two flat plates are joined together at their flat planes, a tremendous force is needed to break the joint. In order that the joined state of the metal and thermoplastic resin is to be maintained stably over an extended period, it is actually necessary for the linear coefficients of expansion of the two materials to be close in value. The linear coefficient of expansion of a thermoplastic resin composition can be lowered considerably by adding a large amount of glass fiber, carbon fiber or other such reinforcing fiber (that is, a filler) but the limit to this is generally 2 to $3 \times 10^{-5\circ}$ C.$^{-1}$. Kinds of metals that have such numerical value at a normal temperature or so are aluminum, magnesium, copper and silver.

The present invention relates to technology that makes possible the injection joining of a hard resin to stainless steel. The linear coefficient of expansion of stainless steel is about $1 \times 10^{-5\circ}$ C.$^{-1}$, which corresponds to about the middle value of the above-mentioned group of metals. In this sense, research and development related to injection joining conducted by the inventors lags behind in priority, while it is thought very likely that it can be used if the temperature range in use is narrow and the inventors have also conducted research and development into stainless steel.

Stainless steel has a specific gravity of about 8. It has high mechanical strength and is used as a metal with high corrosion resistance. Therefore, stainless steel parts are frequently used in various heavy-duty electronic and electrical equipments, medical instruments, automotive mounted equipments, automobile parts, marine machineries and other such parts used in movable equipments and particularly in the casings and housings of equipments that may be exposed to drops of salt water or sea water. If a hard resin can be injected onto stainless steel, the production of these casings or housings for equipments is considered to be extremely easy.

The required conditions for the injection joining of a metal and a resin will once again be summed and explained below based on the hypothesis of the inventors. Specifically, to obtain good injection joining strength, at least the shaped metal should satisfy the following conditions.

(1) The surface has large bumps (surface roughness) obtained by chemical etching and the period thereof is usually on the micron order, which in the present invention refers to the range of 0.5 to 10 μm.

(2) The surface is sufficiently hard (a metal oxide or metal phosphorus oxide) and, to prevent slippage, has a coarse surface that consists of ultrafine bumps on the nanometer order (a coarse surface in subjective view with an electron microscope).

(3) The resin must be a crystalline resin of high hardness, while it is particularly favorable to use these improved compositions in which the crystallization rate during quenching is further slowed.

The findings of the inventors have shown that this hypothesis is correct for magnesium alloys, copper alloys, and titanium alloys. The "coarse surface" in (2) above is a figure of speech expressing what is observed with an electron microscope and high injection joining strength can be obtained when the surface is a ultrafine textured surface in which the spacing period is at least 10 nm and the height or depth was at least 10 nm.

SUMMARY OF THE INVENTION

The present invention was conceived in light of the technical background discussed above and achieves the following object.

It is an object of the present invention to provide a metal and resin composite, in which a resin is joined by injection joining to a piece of shaped stainless steel and a good joint strength is obtained, as well as a method for manufacturing this composite.

It is another object of the present invention to provide a metal and resin composite, in which joinability is improved by injection joining between a shaped stainless steel with surface treatment performed and a high-hardness crystalline resin composition, as well as a method for manufacturing this composite.

The present invention employs the following means for achieving the stated objects.

The composite of metal and resin according to the present invention 1 consists of:

a steel part made of stainless steel, in which the surface is chemically etched after being worked into a specific shape and substantially the entire surface is covered with a ultrafine textured face in which amorphous polygons or particulates with a diameter of 20 to 70 nm are stacked on top of one another, and a resin part made of one type of resin selected from the group consisting of a first resin composition, whose main component is a polyphenylene sulfide resin, a second resin composition whose main component is a polybutylene terephthalate resin and a third resin composition whose main component is an aromatic polyamide resin, which is directly joined by injection molding onto the ultrafine textured face of said steel part.

The method for manufacturing a composite of metal and resin according to the present invention 9 comprises:

a shaping step of shaping a substrate composed of stainless steel by mechanical working;

a liquid treatment step including chemical etching for providing the surface of said shaped substrate with a ultrafine textured face, in which protrusions with a height, width and length of at least 10 nm rise up at a spacing period of at least 10 nm, and for obtaining a surface roughness, in which the mean width (RSm) of profile elements made up of said ultrafine textured face is 0.5 to 10 µm and the maximum height of roughness (Rz) is 0.2 to 5 µm;

an insertion step of inserting said substrate that has undergone the liquid treatment into a metallic mold for injection molding;

an injection step of injecting onto the surface of said inserted substrate one type of resin; and an integration step of integrating said substrate with said one type of resin by said injection, said one type of resin being selected from: a first resin composition in which a polyphenylene sulfide resin is the main component and a polyolefin resin is an auxiliary component, a second resin composition in which a polybutylene terephthalate resin is the main component and a polyethylene terephthalate resin and/or a polyolefin resin is an auxiliary component, and a third resin composition that is a resin composition in which a mixture of different kinds of aromatic polyamide resins is the main component, or a resin composition in which an aromatic polyamide resin is the main component and an aliphatic polyamide resin is an auxiliary component.

The method for manufacturing a composite of metal and resin of present invention 10 comprises:

a shaping step of shaping a substrate composed of stainless steel by mechanical working;

a chemical etching step of immersing the substrate that has undergone said shaping step in a sulfuric acid aqueous solution to chemically etch the surface thereof;

an insertion step inserting the substrate that has undergone said chemical etching into a metallic mold for injection molding;

an injection step of injecting onto the surface of said inserted substrate one type of resin; and an integration step of integrating said substrate with said one type of resin by said injection, said one type of resin being selected from the group consisting of:

a first resin composition in which a polyphenylene sulfide resin is the main component and a polyolefin resin is an auxiliary component, a second resin composition in which a polybutylene terephthalate resin is the main component and a polyethylene terephthalate resin and/or a polyolefin resin is an auxiliary component, and a third resin composition that is a resin composition, in which a mixture of different kinds of aromatic polyamide resins is the main component, or a resin composition in which an aromatic polyamide resin is the main component and an aliphatic polyamide resin is an auxiliary component.

The method for manufacturing a composite of metal and resin according to the present invention 11 comprises:

a shaping step of shaping stainless steel by mechanical working;

a chemical etching step immersing the stainless steel substrate that has undergone said shaping step in a sulfuric acid aqueous solution to chemically etch the surface thereof;

an oxidation step of immersing the substrate that has undergone said chemical etching step in a nitric acid aqueous solution;

an insertion step of inserting the substrate that has undergone said oxidation step into a metallic mold for injection molding;

an injection step of injecting onto the surface of the inserted substrate one type of resin; and an integration step of integrating said substrate with said one type of resin by said injection, said one type of resin being selected from the group consisting of:

a first resin composition in which a polyphenylene sulfide resin is the main component and a polyolefin resin is an auxiliary component, a second resin composition in which a polybutylene terephthalate resin is the main component and a polyethylene terephthalate resin and/or a polyolefin resin is an auxiliary component, and a third resin composition that is a resin composition, in which a mixture of different kinds of aromatic polyamide resins is the main component, or a resin composition in which an aromatic polyamide resin is the main component and an aliphatic polyamide resin is an auxiliary component.

[Field of Application]

Applying the present invention in various fields affords better joinability (fixability), improvement of productivity, higher efficiency, an extended range of application and so forth and makes possible the rationalization of manufacture and the enhancement of corrosion resistance in the casings of electronic equipments and consumer electrical equipments. As a result, the present invention can contribute to better productivity and performance in casings and parts used in mobile electronic equipments, mounted electrical and electronic equipments, marine-use electrical and electronic equipments and many other fields.

[Effectiveness]

As explained in detail above, with the composite and method for manufacturing the composite according to the present invention, a resin composition part and a stainless steel metal part are integrated so that they may not readily come apart. A thermoplastic resin composition having a resin component containing PBT by 70 to 97 wt % and PET and/or polyolefin resin by 3 to 30 wt %, a thermoplastic resin composition having a resin component containing PPS by 70 to 97 wt % and polyolefin resin by 3 to 30 wt % or a thermoplastic resin composition whose main component is an aromatic polyamide resin can be securely joined by injection joining to a shaped part obtained by subjecting a stainless steel metal part to the surface treatment according to the present invention and, as a result, a composite can be manufactured in which a resin and a metal alloy are integrated.

DETAILED DESCRIPTION OF THE PREFERRED EMBODIMENTS

The various elements that make up the composite of metal and resin according to the present invention will now be described in detail.

[Stainless Steel]

The "stainless steel" referred to in the present invention is chromium stainless steel in which chromium (Cr) is added to iron, Cr—Ni stainless steel in which nickel (Ni) is added in combination with chromium (Cr) or any other known corrosion resistant iron alloy that is called stainless steel. Examples include SUS 405, SUS 429, SUS 403 and other such chromium stainless steel and SUS 304, SUS 304L, SUS 316, SUS 316L and other such Cr—Ni stainless steel, as specified by the Japan Industrial Standards (JIS) and so forth. The stainless steel used in the present invention is the product of working a stainless steel from the above list into a specific shape, then chemically etching the surface and forming a natural oxidized layer or a layer oxidized by use of an oxidant.

[Chemical Etching of Stainless Steel]

Most of the various kinds of stainless steel that are commercially available were developed for the purpose of increasing corrosion resistance, so they clearly have chemical resistance and other such characteristics. Known types of metal corrosion include total surface corrosion, pitting, fatigue corrosion and so on, while the corrosive used in the present invention should be selected by trial and error using chemicals that produce total surface corrosion and choosing the etchant that is best suited to the task. According to published documents (such as "Handbook of Chemical Engineering (edited by the Chemical Engineering Society: Japan)"), all types of stainless steel undergo total surface corrosion with an aqueous solution of hydrochloric acid or another such halogenated hydroacid, sulfurous acid, sulfuric acid, a metal halide or the like. A drawback of a stainless steel that is resistant to corrosion by many chemicals is that it will be corroded by halides. This drawback with respect to halides is diminished for stainless steel to which molybdenum has been added, stainless steel in which the carbon content has been reduced and so forth. However, the chemical etchant of stainless steel used in the present invention is basically an aqueous solution that produces the above-mentioned total surface corrosion, while to obtain the optimal etching conditions the immersion conditions should be varied according to the type of stainless steel rather than remaining constant in every case.

A specific example of the treatment conditions will now be described. First, a commercially available stainless steel degreaser, iron degreaser, aluminum alloy degreaser or commercially available general-purpose neutral detergent is procured, an aqueous solution is prepared with a concentration of a few percent or a concentration according to the directions given on the product made by the degreaser manufacturer, the temperature of this aqueous solution is adjusted to about 40 to 70° C. and the metal is immersed for 5 to 10 minutes and then rinsed with water. Specifically, the stainless steel degreasing treatment in the present invention is a common, known treatment method. For SUS 304, it is preferable to adjust a sulfuric acid aqueous solution with a concentration of about 10% to between 60 and 70° C. and immerse the metal in this solution for a few minutes, which gives roughness on the micron order. For SUS 316, it is preferable to adjust a sulfuric acid aqueous solution with a concentration of about 10 to 15% to between 60 and 70° C. and immerse the metal in this solution for a few minutes.

The term "roughness on the micron order" (also called surface roughness) used by the present inventors refers to a textured face with an irregular period of about 0.5 to 10 µm and this textured face can be simply measured by a scanning probe microscope. An actual problem encountered with roughness such as this is that the depth or height difference of the high and low spots is often 0.2 to 3 µm. The surface roughness of a textured face can be automatically measured using a scanning probe microscope, for example. Surface roughness refers to the surface profile, which can be represented by a roughness profile as one of the curves showing the surface profile. This roughness profile is defined by the mean width of the profile elements (RSm), the maximum height of the roughness profile (Rz), etc.

These numerical values are specified by the Japan Industrial Standards (JIS B 0601: 2001). This Japan Industrial Standard (JIS B 0601: 2001) was produced, translating ISO 4287 issued in 1997 into Japanese without changing the technical content or specification table format. The ultrafine textured face on the nanometer level was observed with an electron microscope in magnification of 100,000 times and in magnification of 10,000 times.

Figure 3:
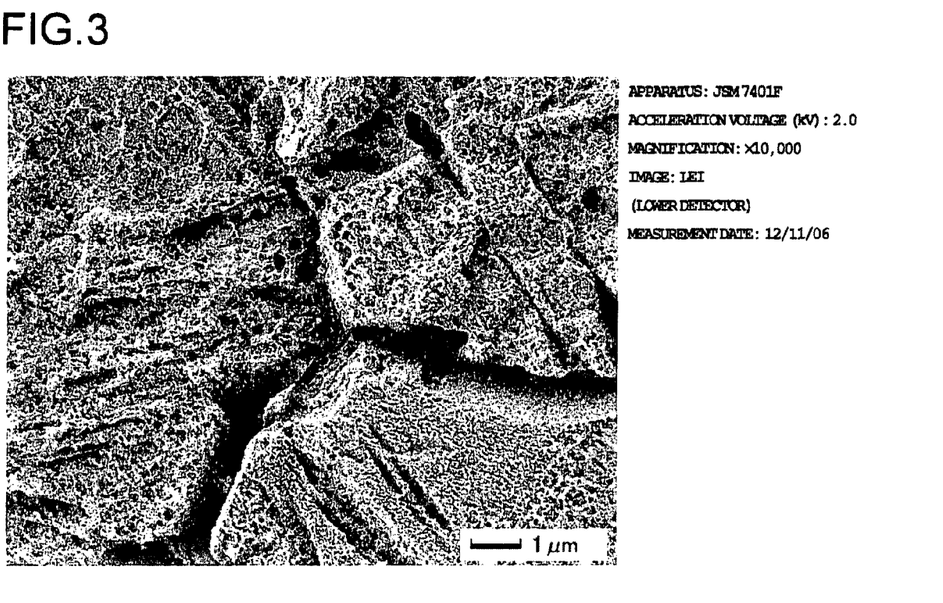
FIG. 3 is an electron micrograph of the surface of SUS 304 in magnification of 10,000 times that has been etched using a sulfuric acid aqueous solution as etchant, rinsed with water and dried.
Figure 4:
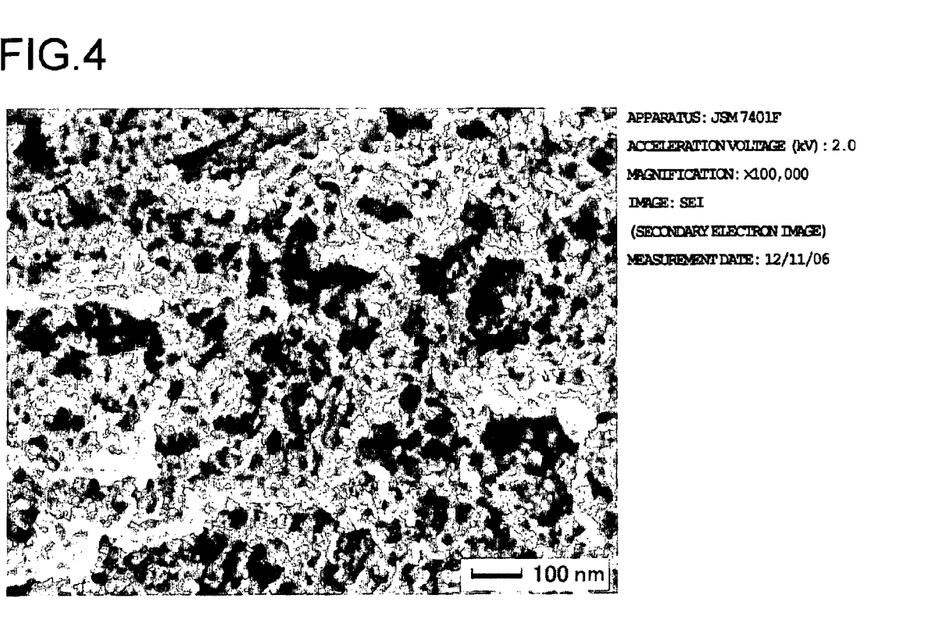
FIG. 4 is an electron micrograph of the surface of SUS 304 in magnification of 100,000 times that has been etched using a sulfuric acid aqueous solution as etchant, rinsed with water and dried.
Figure 5:
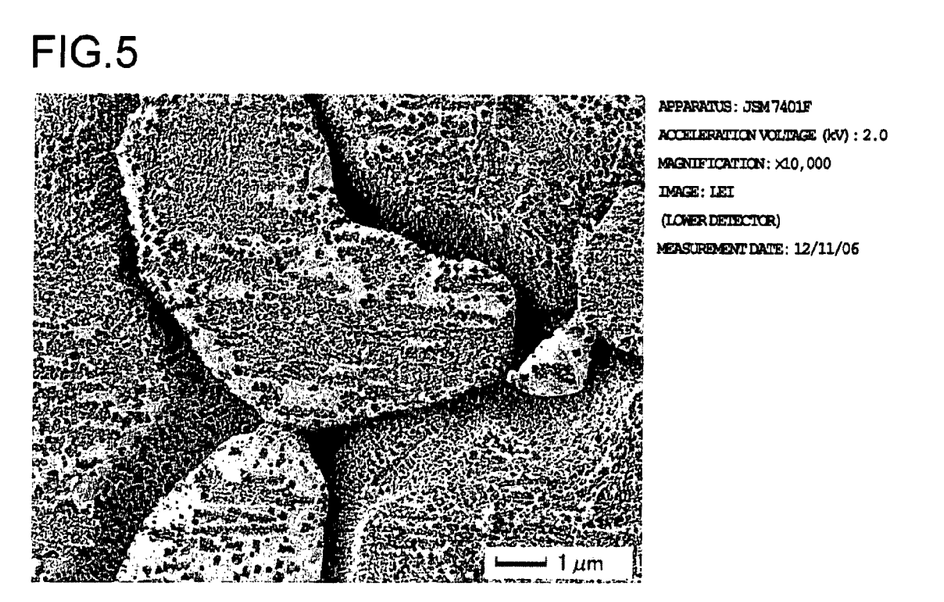
FIG. 5 is an electron micrograph of the surface of SUS 316 in magnification of 10,000 times that has been etched using a sulfuric acid aqueous solution as etchant, rinsed with water and dried.
Figure 6:
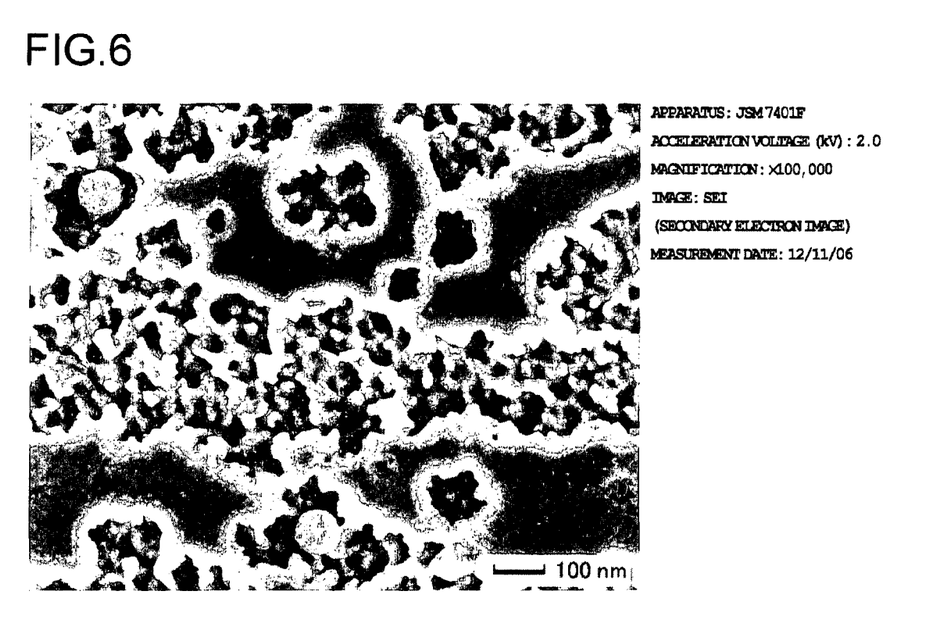
FIG. 6 is an electron micrograph of the surface of SUS 316 in magnification of 100,000 times that has been etched using a sulfuric acid aqueous solution as etchant, rinsed with water and dried.

FIG. 3 is an electron micrograph in magnification of 10,000 times of the surface of a piece of SUS 304 that had been etched using a 10% sulfuric acid aqueous solution at a temperature of 70° C. as the etchant, rinsed with water and dried. FIG. 4 is an electron micrograph in magnification of 100,000 times. FIG. 5 is an electron micrograph in magnification of 10,000 times of the surface of a piece of SUS 316 that had been etched using a 10% sulfuric acid aqueous solution as the etchant, rinsed with water and dried. FIG. 6 is an electron micrograph in magnification of 100,000 times. As shown in the electron micrographs of FIGS. 3 and 5, the surface of the piece of SUS 316 has a shape such that amorphous polygons or particulates with a diameter of 20 to 70 nm are stacked on top of one another with things resembling sloped gullies in a lava bed. To put this another way, the surface of the piece of SUS 316 can be envisaged to have a ultrafine textured face on a level ranging from a few dozen to a few hundred nanometers in a shape that looks as if large boulders or stones had been stacked up in a sloped mound and these would crumble down to the bottom on the occasion of an earthquake, while it can be seen in FIGS. 3 and 5 that the proportion of the area occupied by this ultrafine textured face in the total area is so high as to be approximately 80 to 1000.

A halogenated hydroacid, such as a hydrochloric acid aqueous solution, is suited to etching but when this aqueous solution is brought to a high temperature, there is the risk that part of the acid will volatilize and corrode any surrounding iron structures so that local venting some kind of treatment has to be performed on the exhaust gas. In this respect, the use of a sulfuric acid aqueous solution is preferable in terms of cost. Because of the above situation, a stainless steel substrate that is suited to joining is one in which substantially the entire surface is covered with a ultrafine textured face where amorphous polygons or particulates with a diameter of at least 20 to 70 nm are stacked on top of one another. Also, while this is only supposition, the surface of the stainless steel substrate preferably has an ultrafine textured face in which protrusions with a height, width and length of at least 10 nm rise up at a spacing period of at least 10 nm and has a surface roughness in which the height difference of the bumps made up of the textured face is at least 0.2 µm at a period of 0.5 to 10 µm.

[Surface Hardening of Stainless Steel]

When the above-mentioned stainless steel is thoroughly washed with water after chemical etching, its surface undergoes natural oxidation and goes back to being a surface layer that withstands corrosion, hence as a general rule there is no need for any special hardening treatment. However, to obtain a good, hard metal oxidized layer on the surface of the stainless steel, it is preferable to use a treatment method in which the metal is immersed in an aqueous solution of an oxidative acid, such as nitric acid or another such oxidant, namely, nitric acid, sulfuric acid, hydrogen peroxide, potassium permanganate, sodium chlorate or the like and then rinsed with water. Once etching or the formation of an oxide layer has been completed, the surface is dried, which completes the surface treatment of the stainless steel applied in the present invention.

To find the surface treatment method best suited to the joining referred to in the present invention, it is preferable to adopt the procedure in which the products by surface treatment under various conditions are subjected to an injection joining test, those with the highest joint strength are chosen and the surface of stainless steel treated under the same conditions as these is observed with an electron microscope to confirm the presence of the above-mentioned ultrafine textured face and confirm the configuration thereof. Naturally, the injection joining test may be performed after precedent observation with the electron microscope. In either way, injection joining strength should be high for stainless steel having a fine structured surface in which a ultrafine textured face on a level ranging from a few dozen to a few hundred nanometers is reliably formed and present. This has already been confirmed by the inventors with magnesium alloys, aluminum alloys, copper alloys and titanium alloys.

Let us now discuss the importance of using chemical etching here. Any method can be used as long as the anticipated surface shape discussed above is formed but a question occurs as to why chemical etching is required. This is related to situation where it is believed that the designed ultrafine textured face can be achieved with one of the recent sophisticated ultrafine working methods used today in the manufacture of semiconductors, in which the material is coated with a photochemical resist or dipped in it and visible light rays or ultraviolet rays are used for exposure. However, there are some reasons why chemical etching is particularly favorable for injection joining other than the simplicity of operation entailed.

Specifically, if the chemical etching is carried out under the right conditions, not only will the appropriate bump period and the appropriate recess depth be obtained but the fine shape of the resulting recesses will not be simple and most of the recesses will have an undercut structure. An undercut structure means that there are places that cannot be seen inside the recesses when the recesses are viewed from above in its vertical plane and, if it were possible to look at these microscopically from the bottom of the recess, overhanging places would be seen. It should be easily understood that undercut structures are necessary for injection joining. In other words, an undercut structure is one in which an interior space of a recess is so formed as to be wider than the opening at the surface.

[Resin Composition]

The resin composition used in the present invention is a first resin composition whose main component is a polyphenylene sulfide resin, a second resin composition whose main component is a polybutylene terephthalate resin or a third resin composition whose main component is an aromatic polyamide resin. The resin component of this first resin composition is a resin composition in which a polyphenylene sulfide resin is the main component and a polyolefin resin is an auxiliary component. The resin component of this second resin composition is a resin composition, in which a polybutylene terephthalate resin is the main component and a polyethylene terephthalate resin and/or a polyolefin resin is an auxiliary component. The resin component of this third resin composition is a resin composition whose main component is a polyamide resin, in which different kinds of aromatic polyamide resins are mixed, or a resin composition, in which an aromatic polyamide resin is the main component, and whose auxiliary component is an aliphatic polyamide resin.

The first resin composition preferably contains polyphenylene sulfide resin by 70 to 97 wt % and polyolefin resin by 3 to 30 wt %. The second resin composition preferably contains polybutylene terephthalate resin by 70 to 97 wt % and polyethylene terephthalate resin and/or polyolefin resin by 3 to 30 wt %. The third resin composition preferably contains aromatic polyamide resin by 70 to 95 wt % and aliphatic polyamide resin by 5 to 30 wt %. Preferably, at least one type of reinforcing fiber selected from among glass fiber, carbon fiber, nylon fiber and aramid fiber, in a total amount of 20 to 60 wt % and at least one type of filler selected from among calcium carbonate, magnesium carbonate, silica, talc, clay and glass powder are further added to the first resin composition, the second resin composition or the third resin composition. Specifically, when these are added, the remaining 40 to 80 wt % of the first resin composition, second resin composition or third resin composition is resin component. Adding these reinforcing fibers and fillers allows the linear coefficient of expansion of the molded resin to be adjusted to 2 to $3 \times 10^{-5}$ °$C.^{-1}$ and kept as low as possible.

[Resin Composition/PPS-based]

The PPS resin composition will now be discussed. When the resin component is composed of PPS by 70 to 97% and polyolefin resin by 3 to 30%, a composite with particularly good joint strength can be obtained. If the polyolefin resin content is less than 3%, the effect of adding the polyolefin resin on enhancing injection joining strength will not be reliable and the same applies if its content is over 30%. For a PPS resin to which more than 30% polyolefin resin has been added, the pyrolysis of the polyolefin resin in the injection barrel of the injection molding machine will result in an abnormally large amount of gas being generated, which can hinder even the injection molding itself.

Any PPS can be used as long as it is classified as PPS, while one with a melt viscosity of 100 to 30,000 poise as measured at a temperature of 315° C. and a load of 98 N (10 kgf) with a Koka type flow tester mounted with a die 1 mm in diameter and 2 mm long is preferable because it will have better moldability and workability when formed into a resin composition part. Also, the PPS may be one substituted with amino groups, carboxyl groups or the like or may be one copolymerized with trichlorobenzene or the like during polymerization.

Also, the PPS may be of a linear structure or may have a branched structure within it and may have undergone heat treatment in an inert gas, etc. Furthermore, the ions, oligomers or other such impurities in the PPS may have been reduced by performing a deionization treatment (acid washing, hot water washing, etc.) or washing treatment with an organic solvent such as acetone before or after heating and curing, while its curing may have been promoted by performing a heat treatment in an oxidative gas upon completion of the polymerization reaction.

The polyolefin resin is an ethylene resin, propylene resin or other such material normally known as a polyolefin resin and may be a commercially available product. Of these, maleic anhydride-modified ethylene copolymers, glycidyl methacrylate-modified ethylene copolymers, glycidyl ether-modified ethylene copolymers, ethylene alkyl acrylate copolymers or the like are preferable because a composite with particularly good bondability can be obtained.

Examples of maleic anhydride-modified ethylene copolymers include maleic anhydride graft-modified ethylene copolymers, maleic anhydride-ethylene copolymers and ethylene-acrylic acid ester-maleic anhydride ternary copolymers, of which an ethylene-acrylic acid ester-maleic anhydride ternary copolymer is preferable because a particularly excellent composite is obtained. A specific example of an ethylene-acrylic acid ester-maleic anhydride ternary copolymer is Bondine (made by Arkema, Kyoto, Japan).

Examples of glycidyl methacrylate-modified ethylene copolymers include glycidyl methacrylate graft-modified ethylene copolymers and glycidyl methacrylate-ethylene copolymers, of which a glycidyl methacrylate-ethylene copolymer is preferable because a particularly excellent composite is obtained. A specific example of a glycidyl methacrylate-ethylene copolymer is Bondfast (made by Sumitomo Chemical, Tokyo, Japan). Examples of glycidyl ether-modified ethylene copolymers include glycidyl ether graft-modified ethylene copolymers and glycidyl ether-ethylene copolymers and a specific example of an ethylene alkyl acrylate copolymer is Lotryl (made by Arkema).

With the composite of the present invention, the resin composition part preferably contains polyfunctional isocyanate compound by 0.1 to 6 weight parts and/or epoxy resin by 1 to 25 parts per 100 weight parts of the total resin component including PPS by 70 to 97 wt % and polyolefin resin by 3 to 30 wt %, because the joining of the shaped stainless steel and the resin composition part will be better. A commercially available non-blocked or blocked polyfunctional isocyanate compound can be used as a polyfunctional isocyanate compound.

Examples of polyfunctional non-blocked isocyanate compounds include 4,4'-diphenylmethane diisocyanate, 4,4'-diphenylpropane diisocyanate, toluene diisocyanate, phenylene diisocyanate and bis(4-isocyanate phenyl)sulfone. A polyfunctional blocked isocyanate compound has two or more isocyanate groups per molecule, while these isocyanate groups reacted with a volatile active hydrogen compound, making the material inert at normal temperature. There is no particular restriction on the type of polyfunctional blocked isocyanate compound but generally it will have a structure in which the isocyanate groups are masked by a blocking agent such as an alcohol, a phenol, $\epsilon$-caprolactam, an oxime or an active methylene compound.

An example of a polyfunctional blocked isocyanate is Takenate (made by Mitsui Takeda Chemical, Tokyo, Japan). The epoxy resin can be any commonly known type such as a bisphenol A type or a cresol novolac type. An example of a bisphenol A type epoxy resin is Epikote (made by Japan Epoxy Resin, Tokyo, Japan), while an example of a cresol novolac type epoxy resin is Epiclon (made by Dainippon Ink & Chemicals, Tokyo, Japan).

[Resin Composition/PBT-based]

The PBT resin composition will now be discussed. Preferably, the resin composition will include not just the above-mentioned filler but 3 to 30% PET and/or polyolefin resin and 70 to 97% PBT. Injection joining strength is superior with a PBT resin composition in which PBT is the main component and PET and/or a polyolefin resin is an auxiliary component. The same polyolefin resins as those listed for the PPS resin composition can be used. Joint strength will be highest when the PET and/or polyolefin resin accounts for 5 to 20%, while the joint will still not be so weak at 3 to 5% or at 20 to 30%. However, if the amount is more than 30%, the effect on injection joining strength will be diminished and, if the PET component is over 25%, an ester interchange reaction with PBT will be more likely to proceed at the high temperatures in the injection molding machine, so there is the risk that the strength of the resin itself will be lowered. Also, if the polyolefin resin component is over 30%, more gas will be generated and moldability will tend to be worsened.

[Resin Composition/Aromatic Polyamide Composition]

The aromatic polyamide used in the third resin composition will now be described in specific terms. The aromatic polyamide referred to here can be a polyamide resin synthesized from a phthalic acid and an aliphatic diamine, such as a polyamide resin synthesized from terephthalic acid and hexamethylenediamine (hereinafter referred to as "nylon 6T") or a polyamide resin synthesized from isophthalic acid and hexamethylenediamine (hereinafter referred to as "nylon 6I"). One of the third resin compositions that are favorable for use in the present invention is one in which a mixture of different kinds of aromatic polyamide resins is the main component, a typical example of which is a mixture of the above-mentioned nylon 6T and nylon 6I.

If two types are mixed, it is preferable for one to be the main component and the other an auxiliary component. For instance, if the two combined together account for 100% of the resin component, then the main component preferably accounts for 70 to 90%. Another of the third resin compositions that are favorable for use in the present invention is one in which an aromatic polyamide resin accounts for 75 to 95% of the resin component and an aliphatic polyamide resin accounts for 5 to 25%. In any case, if the amounts are outside the above ranges, the result will be drop in injection joining strength. It is the theory by Ando, one of the inventors that the crystallization rate during quenching is probably increasing (in other words, it is surmised that "it may be approaching to the normal crystallization rate").

[Resin Composition/Filler]

The resin composition that is used is not limited to the first resin composition, second resin composition or third resin composition and at least one type of reinforcing fiber selected from among glass fiber, carbon fiber, nylon fiber and aramid fiber in a combined amount of 20 to 60 wt % and at least one type of filler selected from among calcium carbonate, magnesium carbonate, silica, talc, clay and glass powder are preferably contained in addition to the above compositions. The reason is simple and is that adding these fillers in addition to the resin component lowers the linear coefficient of expansion of the resin composition to about 2 to $3 \times 10^{-5}$° $C.^{-1}$. For metal alloys, a magnesium alloy has a linear coefficient of expansion of about $2.5 \times 10^{-5}$° $C.^{-1}$, which is the maximum in metal alloys, and stainless steel has a linear coefficient of expansion of about 1.0 to $1.1 \times 10^{-5}$° $C.^{-1}$.

The linear coefficient of expansion of the resin composition will never reach the level of stainless steel no matter what is done but, for the resin component alone with no filler contained, the linear coefficient of expansion is close to $10 \times 10^{-5}$° $C.^{-1}$, which is extremely high, so slight changes in the environment temperature cause internal stress to build up at the joint face and over an extended period of time this can lead to failure. The higher the filler content is, the more the linear coefficient of expansion is lowered but, if too much filler is contained, the melt viscosity of the resin composition will rise and injection molding itself will be difficult, so the practical limit will be probably 60% regardless of the type of filler. Also, even if the filler amount is increased to near this limit, the best that can be achieved is a linear coefficient of expansion of about $2\times10^{-5\circ}$ C.$^{-1}$. What this means is that the linear coefficients of expansion of the resin and stainless steel are never going to match. Consequently, a product that has been integrated by injection joining suffers from posing problems when subjected to major temperature changes.

One way to prevent such impediments or accidents from happening is to modify the design so that the thickness or toughness of both materials is not strengthened. For example, if one of the materials is made thinner, the internal strain produced by the difference in linear coefficient of expansion will be decreased by expansion or contraction of the thinner material (the weaker material). Methods such as dividing the joint face are also effective in dispersing the force produced by internal strain to other areas. In any case, it will be necessary to check whether or not there is a tendency of the joint strength to be lowered by subjecting the resulting integrated product to a temperature impact test.

[Composite Manufacturing Method/Injection Joining Method]

To summarize the method of the present invention for manufacturing a composite, a metal part that has undergone the above-mentioned chemical etching, surface hardening treatment and so forth is inserted into a metallic mold for injection molding, the mold is closed, the above-mentioned resin composition is injected and solidified, after which the mold is opened and the product is removed, thus a composite being manufactured. This method for manufacturing a composite is extremely simple and affords good productivity and is, therefore, suited to mass production.

The injection conditions will be described in brief. The temperature of the metallic mold is preferably on the high side since solidification will be too fast if the temperature is too low, even though the resin being used crystallizes more slowly than ordinary resins. Because of this, as well as experimental results, 100° C. or higher is preferable and 120° C. or higher is even better. If the temperature is too high, on the other hand, the injection molding cycle will end up taking longer, so there is a limit from the standpoint of production efficiency. The inventors think that 120 to 150° C. is probably a favorable temperature of the mold. The other conditions, namely, injection temperature, injection pressure and injection rate are not much different from those of ordinary injection molding but, if pressed to say, the injection rate and injection pressure are better on the high side. This will probably be understood from the explanation of theory given above.

Figure 1:
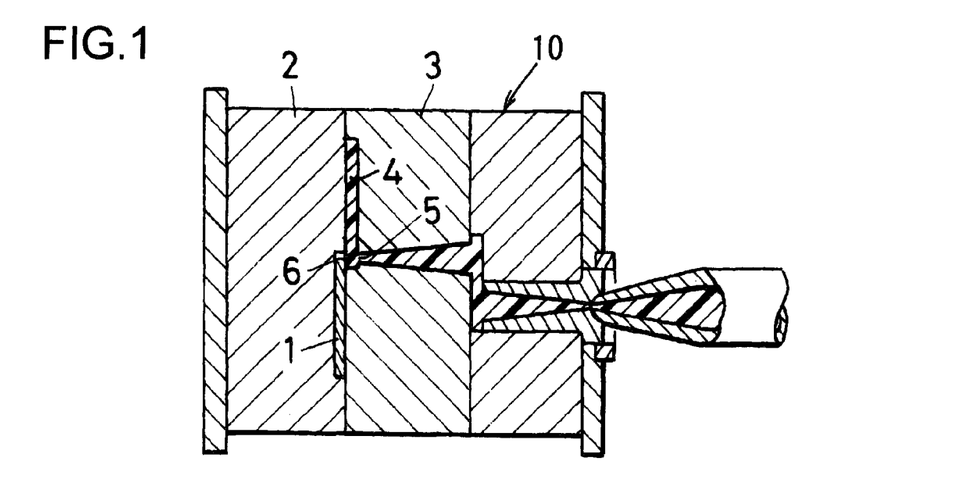
FIG. 1 is a view of a metallic mold schematically illustrating the process of manufacturing a composite of a metal and a resin (a stainless steel piece and a resin composition)
Figure 2:
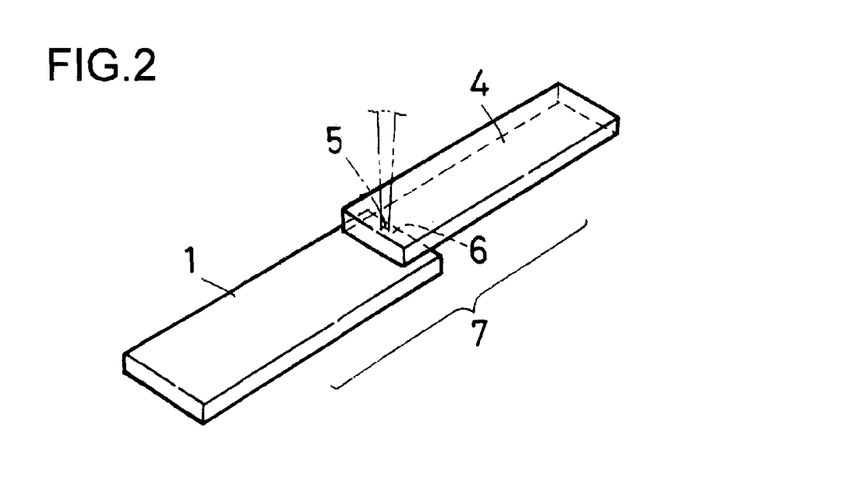
FIG. 2 is an external view schematically illustrating a composite of a metal and a resin (a stainless steel piece and a resin composition)

Embodiments of the present invention will now be described through working examples. FIG. 1 is a cross sectional view of a metallic mold for injection molding 10, schematically illustrating the process of manufacturing a composite of a metal and a resin (a stainless steel piece and a resin composition). FIG. 2 is an exterior view schematically illustrating a composite 7 of a metal and a resin (a stainless steel piece and a resin composition). The metallic mold for injection molding 10 shown in FIG. 1 and the composite 7 shown in FIG. 2 are common to all the working examples. This mold for injection molding 10 is made up of a movable mold plate 2 and a stationary mold plate 3 and a resin injector comprising a pinpoint gate 5, a runner and so forth is constituted on the stationary mold plate 3 side.

The formation of the composite 7 is carried out as follows. First, the movable mold plate 2 is opened and a stainless steel piece 1 is inserted into the cavity formed between the movable mold plate 2 and the stationary mold plate 3. After this insertion, the movable mold plate 2 is closed, resulting in the state before injection. A molten resin composition is then injected through the pinpoint gate 5 into the cavity in which the stainless steel was inserted. Upon being injected, the resin composition 4 is mated with the stainless steel and fills the cavity that is not occupied by the stainless steel, which gives the integrated composite 7 made up of metal and resin. The composite 7 has a joining face 6 between the stainless steel piece 1 and the resin composition 4 and the surface area of this joining face 6 is 5 mm×10 mm. Specifically, the surface area of the joining face 6 is 0.5 cm$^2$. In the following working examples, strength is obtained using the same basis for the surface area of the joining face. Strength is obtained under the same conditions in the comparative examples given below and comparison is made, as well.

WORKING EXAMPLES

Working examples of the present invention will now be described in detail.

The methods for evaluating and measuring the composites obtained in the following working examples will also be described.

[Measurement of PPS Melt Viscosity]

Melt viscosity was measured with a Koka-type flow tester (CFT-500, made by Shimadzu, Kyoto, Japan) equipped with die having a diameter of 1 mm and a length of 2 mm, at a measurement temperature of 315° C. and a load of 98 N (10 kgf).

(a) X-ray Photoelectron Analyzer (XPS Observation)

Surface observation method involved the use of photoelectron analyzer (XPS observation) that analyzes the energy of photoelectrons emitted from the sample upon irradiation of the same with X-rays and performs qualitative and quantitative analysis of elements. This photoelectron analyzer was an Axis-Nova (product name, made by Kratos Analytical: England and Shimadzu: Japan), which is a model that allows a surface only a few microns in diameter to be observed to a depth of a few nanometers.

(b) Electron Microscopy

Electron microscopes were mainly used to observe the substrate surface. These electron microscopes were scanning electron microscopes (SEM): S-4800 (product name, made by Hitachi, Tokyo, Japan) and a JSM-6700F (product name, made by JEOL, Tokyo, Japan), where observations were made at 1 to 2 kV.

(c) Scanning Probe Microscopy

A microscope was used mainly to observe the substrate surface. This microscope is a scanning probe microscope in which a probe with a pointed tip is used so as to move scanning on the surface of the substance and the surface condition is enlarged for observation. This scanning probe microscope was an SPM-9600 (product name; made by Shimadzu, Kyoto, Japan).

[Measurement of Composite Joining Strength]

Tensile stress was measured by pulling the composite 7 in a tensile tester to impart shearing force and the breaking force at break was termed the shear stress. This tensile tester was a Model 1323 (product name; made by Aikoh Engineering, Tokyo, Japan) and the shear was measured at a pulling rate of 10 mm/minute.

Preparation Example 1

PPS Composition Preparation Example 6214 g of $Na_2S.2.9H_2O$ and 17,000 g of N-methyl-2-pyrrolidone were supplied to a 50 liter autoclave equipped with a stirrer. The temperature was gradually raised to 205° C. while stirring the system under a nitrogen gas flow and 1355 g of water was distilled off. This system was cooled to 140° C., after which 7160 g of p-dichlorobenzene and 5000 g of N-methyl-2-pyrrolidone were added and the system was sealed under a nitrogen gas flow. The temperature of the system was raised to 225° C. over 2 hours, the system was polymerized for 2 hours at 225° C., then the temperature was raised to 250° C. over 30 minutes and polymerization was conducted for another 3 hours at 250° C. Upon completion of the polymerization, the system was cooled to room temperature and the polymer was separated in a centrifuge. The solids of the polymer obtained by this separation were repeatedly washed with warm water and dried over night at 100° C., which gave PPS with a melt viscosity of 280 poise (hereinafter referred to as PPS (1)).

This PPS (1) was cured for 3 hours at 250° C. under a nitrogen atmosphere to obtain PPS (hereinafter referred to as PPS (2)). The melt viscosity of the resulting PPS (2) was 400 poise. 6.0 kg of the resulting PPS (2), 1.5 kg of ethylene-acrylic ester-maleic anhydride ternary copolymer (Bondine TX8030, made by Arkema) and 0.5 kg of epoxy resin (Epicote 1004, made by Japan Epoxy Resin) were uniformly mixed preliminarily in a tumbler. After this, glass fiber with an average fiber diameter of 9 µm and a fiber length of 3 mm (RES03-TP91, made by Nippon Sheet Glass, Tokyo, Japan) was supplied by side feeder so that the added amount would be 20 wt % while being melt-kneaded in a biaxial extruder (TEM-35B, made by Toshiba Machine, Shizuoka, Japan) at a cylinder temperature of 300° C., which gave a pelletized PPS composition (1). The resulting PPS composition (1) was dried for 5 hours at 175° C.

Preparation Example 2

Preparation of PPS Composition

The PPS (1) obtained in Preparation Example 1 was cured for 3 hours at 250° C. under an oxygen atmosphere, which gave PPS (hereinafter referred to as PPS (3)). The resulting PPS (3) had a melt viscosity of 1800 poise. 5.98 kg of the resulting PPS (3) and 0.02 kg of polyethylene (Nipolon Hard 8300A, made by Tosoh, Tokyo, Japan) were uniformly mixed preliminarily in a tumbler. After this, glass fiber with an average fiber diameter of 9 µm and a fiber length of 3 mm (RES03-TP91) was supplied by side feeder so that the added amount would be 40 wt % while being melt-kneaded in a biaxial extruder (TEM-35B) at a cylinder temperature of 300° C., which gave a pelletized PPS composition (2). The resulting PPS composition (2) was dried for 5 hours at 175° C.

Preparation Example 3

Preparation of PPS Composition 7.2 kg of the PPS (2) obtained in Preparation Example 1 and 0.8 kg of glycidyl methacrylate-ethylene copolymer (Bondfast E, made by Sumitomo Chemical) were uniformly mixed preliminarily in a tumbler. After this, glass fiber with an average fiber diameter of 9 µm and a fiber length of 3 mm (RES03-TP91) was supplied by side feeder so that the added amount would be 20 wt % while being melt-kneaded in a biaxial extruder (TEM-35B) at a cylinder temperature of 300° C., which gave a pelletized PPS composition (3). The resulting PPS composition (3) was dried for 5 hours at 175° C.

Preparation Example 4

Preparation of PPS

Composition 4.0 kg of the PPS (2) obtained in Preparation Example 1 and 4.0 kg of ethylene-acrylic ester-maleic anhydride ternary copolymer (Bondine TX8030, made by Arkema) were uniformly mixed preliminarily in a tumbler. After this, glass fiber with an average fiber diameter of 9 µm and a fiber length of 3 mm (RES03-TP91) was supplied by side feeder so that the added amount would be 20 wt % while being melt-kneaded in a biaxial extruder (TEM-35B) at a cylinder temperature of 300° C., which gave a pelletized PPS composition (4). The resulting PPS composition (4) was dried for 5 hours at 175° C.

Preparation Example 5

Preparation of PBT Composition 4.5 kg of PBT resin (Toraycon 1100S, made by Toray) and 0.5 kg of PET resin (TR-4550BH, made by Teijin Kasei, Tokyo, Japan) were uniformly mixed in a tumbler. After this, glass fiber with an average fiber diameter of 9 µm and a fiber length of 3 mm (RES03-TP91) was supplied by side feeder so that the added amount would be 30 wt % while being melt-kneaded in a biaxial extruder (TEM-35B) at a cylinder temperature of 270° C., which gave a pelletized PBT resin composition. This was dried for 3 hours at 140° C. to obtain a PBT composition (1).

Preparation Example 6

Preparation of PBT Composition 6.0 kg of PBT resin (Toraycon 1401x31, made by Toray), 0.7 kg of ethylene-acrylic ester-maleic anhydride ternary copolymer (Bondine TX8030, made by Arkema) and 0.15 kg of epoxy resin (Epicote 1004, made by Japan Epoxy Resin) were uniformly mixed preliminarily in a tumbler. After this, glass fiber with an average fiber diameter of 9 µm and a fiber length of 3 mm (RES03-TP91, made by Nippon Sheet Glass) was supplied by side feeder so that the added amount would be 30 wt % while being melt-kneaded in a biaxial extruder (TEM-35B, made by Toshiba Machine) at a cylinder temperature of 270° C., which gave a pelletized PBT composition (2). The resulting PBT composition (2) was dried for 5 hours at 150° C.

Preparation Example 7

Preparation of PBT Composition 6.0 kg of PBT resin (Toraycon 1401x31, made by Toray, Tokyo, Japan), 0.5 kg of PET resin (TR-4550BH, made by Teijin Kasei), 0.5 kg of ethylene-acrylic ester-maleic anhydride ternary copolymer (Bondine TX8030, made by Arkema) and 0.1 kg of epoxy resin (Epicote 1004, made by Japan Epoxy Resin) were uniformly mixed preliminarily in a tumbler. After this, glass fiber with an average fiber diameter of 9 μm and a fiber length of 3 mm (RES03-TP91, made by Nippon Sheet Glass) was supplied by side feeder so that the added amount would be 30 wt % while being melt-kneaded in a biaxial extruder (TEM-35B, made by Toshiba Machine) at a cylinder temperature of 270° C., which gave a pelletized PBT composition (3). The resulting PBT composition (3) was dried for 5 hours at 150° C.

Preparation Example 8

Preparation of Polyamide Resin Composition 15 weight parts of an aromatic polyamide resin (nylon 6T) obtained from hexamethylenediamine and terephthalic acid was mixed in a tumbler with 85 weight parts of an aromatic polyamide resin (nylon 6I) obtained from hexamethylene-diamine and isophthalic acid. After this, glass fiber with an average fiber diameter of 9 μm and a fiber length of 3 mm (RES03-TP91, made by Nippon Sheet Glass) was supplied by side feeder so that the added amount would be 30 weight parts while being melt-kneaded in a biaxial extruder (TEM-35B, made by Toshiba Machine) at a cylinder temperature of 300° C., which gave a pelletized aromatic polyamide resin composition (1). The resulting aromatic polyamide resin composition (1) was dried for 10 hours at 80° C.

Preparation Example 9

Preparation of Polyamide Resin Composition 85 weight parts of an aromatic polyamide resin (nylon 6I) obtained from hexamethylenediamine and isophthalic acid was mixed in a tumbler with 15 weight parts of nylon 6 resin. After this, glass fiber with an average fiber diameter of 9 μm and a fiber length of 3 mm (RES03-TP91, made by Nippon Sheet Glass) was supplied by side feeder so that the added amount will be 30 weight parts while being melt-kneaded in a biaxial extruder (TEM-35B, made by Toshiba Machine) at a cylinder temperature of 280° C., which gave a pelletized aromatic polyamide resin composition (2). The resulting aromatic polyamide resin composition (2) was dried for 10 hours at 80° C.

Working Example 1

Commercially available SUS 304 sheeting with a thickness of 1.0 mm was purchased and cut into numerous rectangular pieces measuring 18 mm×45 mm to obtain stainless steel pieces as metal pieces 1. A hole was formed to pass through the end of each steel piece, copper wire coated with polyvinyl chloride was passed through the holes of a dozen or so pieces and the copper wire was bent so that the stainless steel pieces would not overlap each other, thus allowing all pieces to be hung up at the same time. An aqueous solution containing aluminum alloy degreaser (NE-6, made by Meltex (Tokyo, Japan)) by 7.5% was adjusted to 60° C. and made ready in a tank, while the above-mentioned stainless steel pieces were immersed for 5 minutes and thoroughly rinsed with tap water (Ota City, Gunma, Japan).

In the next, an aqueous solution containing sulfuric acid (98% concentration) by 10% and adjusted to 70° C. was made ready in another tank and the above-mentioned metal pieces were immersed for 6 minutes and then thoroughly rinsed with deionized water. They were then dried for 15 minutes in a warm air dryer set to 90° C. The surface was dark brown in color. The copper wire was taken out of the stainless steel pieces placed on a clean aluminum foil and the pieces were wrapped up together, then put in a plastic bag, sealed and stored. In this work, no fingers touched the faces to be joined (the end portion on the opposite side from where each hole was formed).

Two days later, one of the pieces was cut and observed with an electron microscope and a scanning probe microscope. The results of observation with the electron microscope in magnification of 10,000 times and 100,000 times are shown in FIGS. 3 and 4 respectively. How the surface looked can be seen in detail in FIG. 4 and the appearance is such that amorphous polygons or particulates with a diameter of 20 to 70 nm are stacked on top of one another with the surface covered with the above-mentioned ultrafine textured face that looks like gullies. It can be seen in FIG. 3 that this ultrafine textured face extends over the entire surface. Observation with the scanning probe microscope revealed a rough surface covered with a roughness of 0.5 to 3 μm. With XPS, large amounts of oxygen, iron, nickel and chromium were detected and small amounts of carbon and sulfur were also found. The surface layer was therefore considered to be the same as an ordinary oxidized film on stainless steel.

One day later the remaining stainless steel pieces were taken out, the portion with the hole formed was grasped with a glove so that no oil or the like would adhere and each piece was inserted into a metallic mold for injection molding. The mold was closed and the PPS composition (1) obtained in Preparation Example 1 was injected at an injection temperature of 310° C. The temperature of the metallic mold was 140° C. and 20 of the integrated composites shown in FIG. 2 were obtained. The size of the resin part was 10 mm×45 mm×5 mm and the joining face 6 measured 10 mm×5 mm (0.5 cm$^2$). These products were placed for 1 hour in a hot air dryer set at 170° C. on the day of molding to anneal them and then further one day later they were subjected to a tensile test, which revealed the average shear breaking strength to be 25 MPa.

Working Example 2

Other than using the PPS composition (2) obtained in Preparation Example 2 instead of the PPS composition (1) obtained in Preparation Example 1, stainless steel pieces were produced, injection molding was performed and composites were obtained by exactly the same method as in Working Example 1. The composites thus obtained were annealed for 1 hour at 170° C. In short, in this experiment a PPS containing only a tiny amount of polyolefin polymer and a PPS resin composition containing only filler were used. One day later, ten of these were subjected to a tensile test, which revealed the average shear breaking strength to be 13.5 MPa. This was far from Working Example 1 and the difference in the resin material used showed up in the result.

Working Example 3

Other than using the PPS composition (3) obtained in Preparation Example 3 instead of the PPS composition (1) obtained in Preparation Example 1, composites were obtained by exactly the same method as in Working Example 1. The composites were annealed for 1 hour at 170° C. on the day of molding and two days later these composites were measured for shear breaking strength with a tensile tester, the average of which was 20 MPa.

Comparative Example 1

Other than using the PPS composition (4) obtained in Preparation Example 4 instead of the PPS composition (1), an attempt was made to obtain a composite by the same method as in Working Example 1. That is, in this experiment a PPS resin composition was used that contained an extremely large amount of polyolefin polymer. However, a large quantity of gas was generated during molding and this caused molding to be stopped. In this experiment the main component of the resin composition was not PPS.

Working Example 4

Other than using the PBT composition (1) obtained in Preparation Example 5 instead of the PPS composition (1) obtained in Preparation Example 1, stainless steel pieces were produced, injection molding was performed and composites were obtained by exactly the same method as in Working Example 1. The injection temperature was 280° C., the mold temperature was 140° C. and the annealing conditions for the obtained composites were 1 hour at 150° C. One day later, these composites were subjected to a tensile test, which revealed the shear breaking strength to be an average of 26 MPa for 10 pieces.

Working Example 5

Other than using the PBT composition (2) obtained in Preparation Example 6 instead of the PBT composition (1) obtained in Working Example 5, stainless steel pieces were produced, injection molding was performed and composites were obtained by exactly the same method as in Working Example 5. The annealing conditions for the obtained composites were also the same. One day later, these composites were subjected to a tensile test, which revealed the shear breaking strength to be an average of 23.1 MPa for 10 pieces.

Working Example 6

Other than using the PBT composition (3) obtained in Preparation Example 7 instead of the PBT composition (1) obtained in Preparation Example 5, stainless steel pieces were produced, injection molding was performed and composites were obtained by exactly the same method as in Working Example 5. The annealing conditions for the obtained composites were also the same. One day later, these composites were subjected to a tensile test, which revealed the shear breaking strength to be an average of 29.1 MPa for 10 pieces.

Working Example 7

Commercially available SUS 304 sheeting was treated part way in exactly the same manner as in Working Example 1. That is, it was degreased and rinsed with water, etched with a sulfuric acid aqueous solution and rinsed with water. A nitric acid aqueous solution with a concentration of 30 was then made ready, adjusted to 40° C., the above-mentioned metal pieces were immersed in this for 3 minutes and thoroughly rinsed with deionized water. They were then dried for 15 minutes in a warm air dryer set to 90° C. After this, the PPS composition (1) was used to perform injection joining and the resulting composites were annealed, all in exactly the same manner as in Working Example 1. A tensile test conducted one day after the annealing revealed the average shear breaking strength to be 28.3 MPa.

Working Example 8

Commercially available SUS 316 sheeting with a thickness of 1.0 mm was purchased and cut into numerous rectangular pieces measuring 18 mm×45 mm to obtain stainless steel pieces as metal pieces 1. A hole was formed to pass through the end of each steel piece, copper wire coated with polyvinyl chloride was passed through the holes of a dozen or so pieces and the copper wire was bent so that the stainless steel pieces would not overlap each other, thus allowing all pieces to be hung up at the same time. An aqueous solution containing aluminum alloy degreaser (NE-6, made by Meltex) by 7.5% was adjusted to 60° C. and made ready in a tank and the above-mentioned stainless steel pieces were immersed for 5 minutes and thoroughly rinsed with tap water (Ota City, Gunma, Japan).

In the next, an aqueous solution containing 980 sulfuric acid in an amount of 10% and adjusted to 70° C. was made ready in another tank. The above-mentioned steel pieces were immersed for 3 minutes and then thoroughly rinsed with deionized water. They were then dried for 15 minutes in a warm air dryer set to 90° C. The surface was pale dark brown in color. The copper wire was taken out of the stainless steel pieces placed on a clean aluminum foil and the pieces were wrapped up together, then put in a plastic bag, sealed and stored. In this work, no fingers touched the faces to be joined (the end portion on the opposite side from where each hole was formed).

Two days later, one of the pieces was cut and observed with an electron microscope and a scanning probe microscope. The results of observation with the electron microscope in magnitude of 10,000 times and 100,000 times are shown in FIGS. 5 and 6 respectively. How the surface looked can be seen in detail in FIG. 6, and the appearance is such that amorphous polygons or particulates with a diameter of 20 to 50 nm are stacked on top of one another, with the surface covered with the above-mentioned ultrafine textured face that looks like gullies. It can be seen in FIG. 5 that this fine textured face extends over 80 to 90% of the surface. One day later the remaining stainless steel pieces were taken out, the portion with the hole formed was grasped with a glove so that no oil or the like would adhere and each piece was inserted into a metallic mold for injection molding. The mold was closed and the PPS composition (1) obtained in Preparation Example 1 was injected at an injection temperature of 310° C. The temperature of the metallic mold was 140° C. and 20 of the integrated composites shown in FIG. 2 were obtained. The size of the resin part was 10 mm×45 mm×5 mm and the joining face 6 measured 10 mm×5 mm (0.5 cm$^2$). These products were placed for 1 hour in a hot air dryer set at 170° C. on the day of molding to anneal them and then one day later they were subjected to a tensile test, which revealed the average shear breaking strength to be 24 MPa.

Working Example 9

Commercially available SUS 301 sheeting with a thickness of 1.0 mm was purchased and cut into numerous rectangular pieces measuring 18 mm×45 mm to obtain stainless steel pieces as metal pieces 1. A hole was formed to pass through the end portion of each steel piece, copper wire coated with polyvinyl chloride was passed through the holes of a dozen or so pieces and the copper wire was bent so that the stainless steel pieces would not overlap each other, thus allowing all pieces to be hung up at the same time. An aqueous solution containing aluminum alloy degreaser (NE-6, made by Meltex, Tokyo, Japan) by 7.5% was adjusted to 60° C. and made ready in a tank and the above-mentioned stainless steel pieces were immersed for 5 minutes and thoroughly rinsed with tap water (Ota City, Gunma, Japan).

In the next, an aqueous solution containing caustic soda by 1.5% and adjusted to 40° C. was made ready in another tank and the above-mentioned metal pieces were immersed for 1 minute and then thoroughly rinsed with water. Then, an aqueous solution adjusted to 65° C. and containing sulfuric acid (98% concentration) by 5% and ammonium monohydrodifluoride by 1% was made ready in another tank and the above-mentioned metal pieces were immersed in this for 1 minute and then thoroughly rinsed with deionized water. They were then immersed for 3 minutes in an aqueous solution containing nitric acid by 3% and adjusted to 40° C. and then thoroughly rinsed with deionized water. They were then dried for 15 minutes in a warm air dryer set to 90° C. The surface was dark brown in color. The copper wire was taken out of the stainless steel pieces placed on a clean aluminum foil and the pieces were wrapped up together, then put in a plastic bag, sealed and stored. In this work, no fingers touched the face to be joined (the end portion on the opposite side from where each hole was formed).

Two days later, one of the pieces was cut and observed with an electron microscope and a scanning probe microscope. The results of observation with the electron microscope in magnitude of 100,000 times reveal that the appearance is such that amorphous polygons or particulates with a diameter of 20 to 70 nm are stacked on top of one another with the surface covered with the above-mentioned ultrafine textured face that looks like gullies. Observation with the scanning probe microscope revealed a rough surface covered with a roughness of 1 to 2.5

Further one day later the remaining stainless steel pieces were taken out, the portion with the hole formed was grasped with a glove so that no oil or the like would adhere and each piece was inserted into a metallic mold for injection molding. The mold was closed and the PPS composition (1) obtained in Preparation Example 1 was injected at an injection temperature of 310° C. The mold temperature was 140° C. and 20 of the integrated composites shown in FIG. 2 were obtained. The size of the resin part was 10 mm×45 mm×5 mm and the joining face 6 measured 10 mm×5 mm (0.5 cm$^2$). These products were placed for 1 hour in a hot air dryer set at 170° C. on the day of molding to anneal them and then one day later they were subjected to a tensile test, which revealed the average shear breaking strength to be 22 MPa.

Working Example 10

Commercially available SUS 430 sheeting with a thickness of 1.0 mm was purchased and cut into numerous rectangular pieces measuring 18 mm×45 mm to obtain stainless steel pieces as metal pieces 1. A hole was formed to pass through the end of each steel piece, copper wire coated with polyvinyl chloride was passed through the holes of a dozen or so pieces and the copper wire was bent so that the stainless steel pieces would not overlap each other, thus allowing all pieces to be hung up at the same time. An aqueous solution containing aluminum alloy degreaser (NE-6, made by Meltex, Tokyo, Japan) by 7.5% was adjusted to 60° C. and made ready in a tank and the above-mentioned stainless steel pieces were immersed for 5 minutes and thoroughly rinsed with tap water (Ota City, Gunma, Japan).

In the next, an aqueous solution containing caustic soda by 1.5% and adjusted to 40° C. was made ready in another tank and the above-mentioned metal pieces were immersed for 1 minute and then thoroughly rinsed with water. Then, an aqueous solution adjusted to 65° C. and containing sulfuric acid (98% concentration) by 10% and ammonium monohydrodifluoride by 1% was made ready in another tank and the above-mentioned metal pieces were immersed in this for 3 minute and then thoroughly rinsed with deionized water. They were then immersed for 3 minutes in an aqueous solution containing nitric acid by 3% and adjusted to 40° C. and then thoroughly rinsed with deionized water. They were then dried for 15 minutes in a warm air dryer set to 90° C. The surface was dark brown in color. The copper wire was taken out of the stainless steel pieces placed on a clean aluminum foil and the pieces were wrapped up together, then put in a plastic bag, sealed and stored. In this work, no fingers touched the surfaces to be joined (the end portion on the opposite side from where each hole was made).

One week after the above, the stainless steel pieces were taken out, the portion with the hole formed was grasped with a glove so that no oil or the like would adhere and was inserted into a metallic mold for injection molding. The mold was closed and the PPS composition (1) obtained in Preparation Example 1 was injected at an injection temperature of 310° C. The temperature of the metallic mold was 140° C. and 20 of the integrated composites shown in FIG. 2 were obtained. The size of the resin part was 10 mm×45 mm×5 mm and the joining face 6 measured 10 mm×5 mm (0.5 cm$^2$). These products were placed for 1 hour in a hot air dryer set at 170° C. on the day of molding to anneal them and then one day later they were subjected to a tensile test, which revealed the average shear breaking strength to be 20 MPa.

Working Example 11

Commercially available SUS 403 sheeting with a thickness of 1.0 mm was purchased and cut into numerous rectangular pieces measuring 18 mm×45 mm to obtain stainless steel pieces as metal pieces 1. A hole was formed to pass through the end of each steel piece, copper wire coated with polyvinyl chloride was passed through the holes of a dozen of or so pieces and the copper wire was bent so that the stainless steel pieces would not overlap each other, thus allowing all pieces to be hung up at the same time. An aqueous solution containing aluminum alloy degreaser (NE-6, made by Meltex, Tokyo, Japan) by 7.5% was adjusted to 60° C. and made ready in a tank and the above-mentioned stainless steel pieces were immersed for 5 minutes and thoroughly rinsed with tap water (Ota City, Gunma, Japan).

In the next, an aqueous solution containing caustic soda by 1.5% and adjusted to 40° C. was made ready in another tank and the above-mentioned metal pieces were immersed for 1 minute and then thoroughly rinsed with water. Then, an aqueous solution adjusted to 65° C. and containing sulfuric acid (98% concentration) by 10% and ammonium monohydrodifluoride by 1% was made ready in a separate tank and the above-mentioned metal pieces were immersed in this for 1.5 minute and then thoroughly rinsed with deionized water. They were then immersed for 3 minutes in an aqueous solution containing nitric acid by 3% and adjusted to 40° C. and then thoroughly rinsed with deionized water. They were then dried for 15 minutes in a warm air dryer set to 90° C. The surface was dark brown in color. The copper wire was taken out of the stainless steel pieces placed on a clean aluminum foil and the pieces were wrapped up together, then put in a plastic bag, sealed and stored. In this work, no fingers touched the surfaces to be joined (the end portion on the opposite side from where each holes was formed).

One week after the above, the stainless steel pieces were taken out, the portion with the hole formed was grasped with a glove so that no oil or the like would adhere and each piece was inserted into a metallic mold for injection molding. The mold was closed and the PPS composition (1) obtained in Preparation Example 1 was injected at an injection temperature of 310° C. The temperature of the metallic mold was 140° C. and 20 of the integrated composites shown in FIG. 2 were obtained. The size of the resin part was 10 mm×45 mm×5 mm and the joining face 6 measured 10 mm×5 mm (0.5 cm$^2$). These products were placed for 1 hour in a hot air dryer set at 170° C. on the day of molding to anneal them and then one day later they were subjected to a tensile test, which revealed the average shear breaking strength to be 18 MPa.

Working Example 12

Commercially available SUS 304BA sheeting with a thickness of 1.0 mm was purchased and cut into numerous rectangular pieces measuring 18 mm×45 mm to obtain stainless steel pieces as metal pieces 1. A hole was formed to pass through the end of each steel piece, copper wire coated with polyvinyl chloride was passed through a dozen of or so pieces and the copper wire was bent so that the stainless steel pieces would not overlap each other, thus allowing all pieces to be hung up at the same time. An aqueous solution containing aluminum alloy degreaser (NE-6, made by Meltex, Tokyo, Japan) by 7.5% was adjusted to 60° C. and made ready in a tank and the above-mentioned stainless steel pieces were immersed for 5 minutes and thoroughly rinsed with tap water (Ota City, Gunma, Japan).

In the next, an aqueous solution containing caustic soda by 1.5% and adjusted to 40° C. was made ready in another tank and the above-mentioned metal pieces were immersed for 1 minute and then thoroughly rinsed with water. Then, an aqueous solution adjusted to 65° C. and containing sulfuric acid (98% concentration) by 5% and ammonium monohydrodifluoride by 1% was made ready in another tank and the above-mentioned metal pieces were immersed in this for 8 minute and then thoroughly rinsed with deionized water. They were then immersed for 3 minutes in an aqueous solution containing nitric acid by 3% and adjusted to 40° C. and then thoroughly rinsed with deionized water. They were then dried for 15 minutes in a warm air dryer set to 90° C. The surface was dark brown in color. The copper wire was taken out of the stainless steel pieces placed on a clean aluminum foil and the pieces were wrapped up together, then put in a plastic bag, sealed and stored. In this work, no fingers touched the surfaces to be joined (the end portion on the opposite side from where each hole was formed).

One week after the above, the stainless steel pieces were taken out, the portion with the hole formed was grasped with a glove so that no oil or the like would adhere and was inserted into a metallic mold for injection molding. The mold was closed and the PPS composition (1) obtained in Preparation Example 1 was injected at an injection temperature of 310° C. The temperature of the metallic mold was 140° C. and 20 of the integrated composites shown in FIG. 2 were obtained. The size of the resin part was 10 mm×45 mm×5 mm and the joining face 6 measured 10 mm×5 mm (0.5 cm$^2$). These products were placed for 1 hour in a hot air dryer set at 170° C. on the day of molding to anneal them and then one day later they were subjected to a tensile test, which revealed the average shear breaking strength to be 22 MPa.

Working Example 13

Other than using the aromatic polyamide resin composition (1) obtained in Preparation Example 8 instead of the PPS composition (1) obtained in Preparation Example 1, composites were obtained by the same method as in Working Example 1. The composites were annealed for 1 hour at 170° C. on the day of the molding and two days later, these composites were subjected to a tensile test, which revealed the shear breaking strength to be an average of 20 MPa.

Working Example 14

Other than using the aromatic polyamide resin composition (2) obtained in Preparation Example 9 instead of the aromatic polyamide resin composition (1) obtained in Preparation Example 8, composites were obtained by the same method as in Working Example 13. The composites were annealed for 1 hour at 170° C. on the day of the molding and two days later, these composites were subjected to a tensile test, which revealed the shear breaking strength to be an average of 19 MPa.

Working Example 15

Three composites of the PPS composition (1) and SUS 304 obtained by the method of Working Example 1 were subjected to a temperature impact test. The temperature impact program involved cycles, each of which consists of holding a temperature of −55° C. for 30 minutes, raising the temperature to +150° C. within 5 minutes thereafter, holding the temperature there for 30 minutes and then lowering the temperature back to −55° C. within 5 minutes. 1000 cycles were carried out, after which the composites were taken out of the temperature impact tester, subjected to a tensile test on the following day and measured for shear breaking strength, which was found to be an average of 23 MPa. Assuming that the original value is 25 MPa obtained in Working Example 1, then the joint strength seems to be in a level which is not be considered as having been lowered substantially.

What is claimed is:
1. A method for manufacturing a composite of metal and resin, comprising:
   a shaping step of shaping a substrate composed of stainless steel by mechanical working;
   a liquid treatment step including chemical etching with a sulfuric acid aqueous solution for providing the surface of said shaped substrate with an ultrafine textured face, in which protrusions with a height, width and length of at least 10 nm rise up at a spacing period of at least 10 nm, and for obtaining a surface roughness, in which the mean width (RSm) of profile elements made up of said ultrafine textured face is 0.5 to 10 μm and the maximum height of roughness (Rz) is 0.2 to 5 μm;
   an insertion step of inserting said substrate that has undergone the liquid treatment into a metallic mold for injection molding;
   an injection step of injecting a resin onto the surface of said inserted substrate; and an integration step of integrating said substrate with the resin by said injection, wherein the resin used in the method is a resin composition consisting of: 70 to 97 wt% of a mixture of different kinds of aromatic polyamide resins, or 70 to 97 wt% of an aromatic polyamide resin; and 3 to 30 wt% of an aliphatic polyamide resin wherein the resin is the third resin composition.

2. A method for manufacturing a composite of metal and resin, comprising:

a shaping step of shaping stainless steel by mechanical working;

a chemical etching step immersing the stainless steel substrate that has undergone said shaping step in a sulfuric acid aqueous solution to chemically etch the surface thereof for providing the surface of said shaped substrate with an ultrafine textured face, in which protrusions with a height, width and length of at least 10 nm rise up at a spacing period of at least 10 nm, and for obtaining a surface roughness, in which the mean width (RSm) of profile elements made up of said ultrafine textured face is 0.5 to 10 μm and the maximum height of roughness (Rz) is 0.2 to 5 μm, an oxidation step of immersing the substrate that has undergone said chemical etching step in a nitric acid aqueous solution;

an insertion step of inserting the substrate that has undergone said oxidation step into a metallic mold for injection molding;

an injection step of injecting a resin onto the surface of the inserted substrate; and an integration step of integrating said substrate with the resin by said injection, wherein the resin used in the method is a resin composition consisting of: 70 to 97 wt% of a mixture of different kinds of aromatic polyamide resins, or 70 to 97 wt% of an aromatic polyamide resin; and 3 to 30 wt% of an aliphatic polyamide resin wherein the resin is the third resin composition.

* * * * *